No. 677,035. Patented June 25, 1901.
J. H. LAIRD.
MEAT BROILER.
(Application filed Apr. 25, 1900.)
(No Model.)
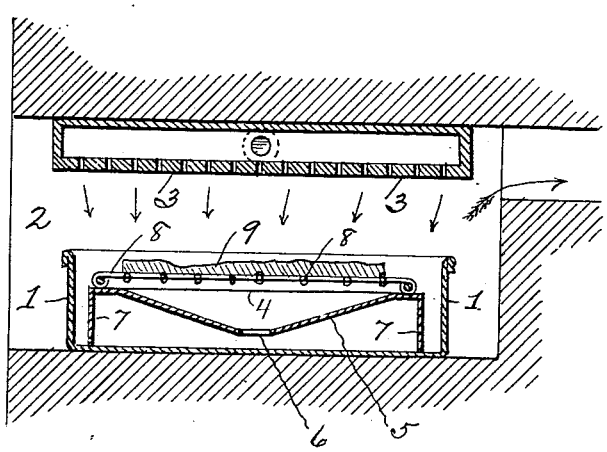
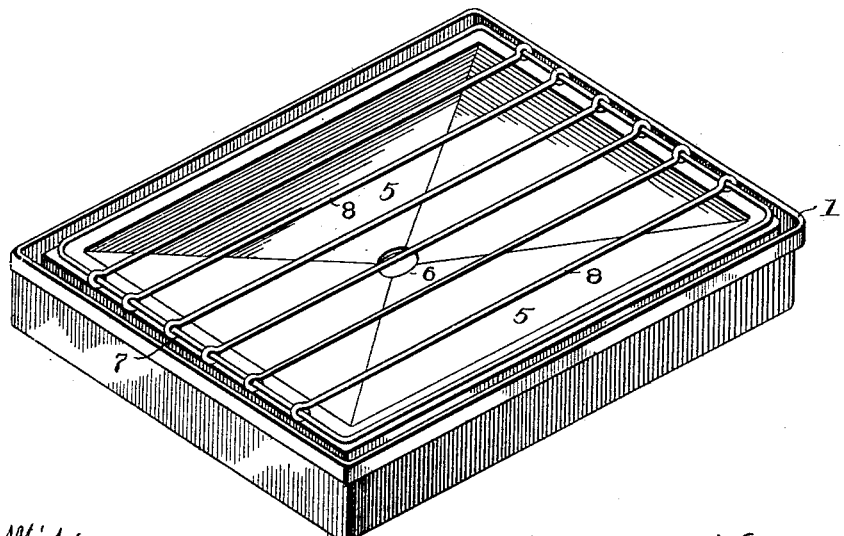

UNITED STATES PATENT OFFICE.

JENNIE H. LAIRD, OF PITTSBURG, PENNSYLVANIA.

MEAT-BROILER.

SPECIFICATION forming part of Letters Patent No. 677,035, dated June 25, 1901.

Application filed April 25, 1900. Serial No. 14,304. (No model.)

*To all whom it may concern:*

Be it known that I, JENNIE H. LAIRD, a citizen of the United States of America, residing at 1516 Cliff street, Pittsburg, in the county of Allegheny and State of Pennsylvania, have invented certain new and useful Improvements in Meat-Broilers; and I do hereby declare the following to be a full, clear, and exact description thereof, reference being had to the accompanying drawings, which form a part of this specification.

My invention relates to an improved meat-broiler; and it consists in certain details of construction and combination of parts, as will be fully described hereinafter.

This invention relates more particularly to that class of meat-broilers used in an oven with an overhead gas-burner, and in the use of such broilers the fat and grease accumulating in the pan below frequently take fire, thereby burning and otherwise injuring the meat, and to provide a means to remedy this evil injurious feature is the object of my invention.

In the accompanying drawings, Figure 1 is a central sectional elevation of my improved broiler placed in the oven of a range provided with an overhead gas-burner. Fig. 2 is a detail perspective view of my improved meat-broiler removed from the oven.

To construct a broiler in accordance with my invention, I provide a pan 1, of a suitable size and form of construction, preferably rectangular in form, and arranged within the said pan is a supplemental plate supported upon legs 7 and formed with a dished center 5, tapering from the outer periphery to a central opening 6. Placed upon the top of this plate or shelf 5 is a spider 8, rectangular in form and constructed from strong wire or bars, and is used for supporting the meat 9 while being boiled. The plate 5 is supported a short distance above the bottom of the outer pan 1, leaving an intervening space for the accumulation of the grease extracted from the meat.

In operation the broiler, constructed as described, is placed in the oven 2 of the range, the steak or meat 9 resting upon the top of the spider 8. The fire from the burner 3 will melt the fat of the meat, and the same dropping to the shelf 5 beneath will flow down the inclined sides of the same and pass to the pan below through the central opening 6. By this construction and arrangement the fire is kept away from the grease, and the same is in a comparatively cool condition and in no danger of igniting.

Various slight modifications and changes may be made in the details of construction without departing from the spirit of the invention.

Having thus described my invention, what I claim, and desire to secure by Letters Patent, is—

The herein-described meat-broiler, consisting of the outer pan 1, of a suitable size and form, the inner shelf or plate 5 arranged therein and supported a short distance above the base, the said plate or shelf being dished or inclined from the outer periphery to the center and provided at that point with an opening 6, a spider formed from bars 8 adapted to rest upon the top of the plate, in combination with an oven having an overhead gas-burner, whereby meat placed upon the bars 8 is broiled by heat descending from above, all arranged and combined for service substantially as and for the purpose described.

In testimony whereof I have hereunto affixed my signature in the presence of two subscribing witnesses.

JENNIE H. LAIRD.

Witnesses:
M. E. HARRISON,
JOHN GROETZINGER.